United States Patent
Eatough et al.

(10) Patent No.: US 7,757,228 B1
(45) Date of Patent: Jul. 13, 2010

(54) SYSTEMS AND METHODS FOR WRITING AN IMAGE TO A COMPUTER SYSTEM

(75) Inventors: David A. Eatough, Herriman, UT (US); Paul Hillyard, Lindon, UT (US)

(73) Assignee: LANDesk Software Limited, Shannon (IE)

( * ) Notice: Subject to any disclaimer, the term of this patent is extended or adjusted under 35 U.S.C. 154(b) by 969 days.

(21) Appl. No.: 10/787,366

(22) Filed: Feb. 26, 2004

(51) Int. Cl.
*G06F 9/445* (2006.01)

(52) U.S. Cl. ..................................... 717/174

(58) Field of Classification Search ................. 717/168, 717/171–174, 176–178; 711/100, 129, 155, 711/173
See application file for complete search history.

(56) References Cited

U.S. PATENT DOCUMENTS

| | | | | |
|---|---|---|---|---|
| 5,764,593 A * | 6/1998 | Turpin et al. | .................... | 713/2 |
| 5,842,024 A * | 11/1998 | Choye et al. | ................. | 717/178 |
| 5,974,567 A * | 10/1999 | Dickson et al. | ............... | 714/27 |
| 6,144,992 A * | 11/2000 | Turpin et al. | ................ | 709/208 |
| 6,253,300 B1 * | 6/2001 | Lawrence et al. | ........... | 711/173 |
| 6,418,449 B1 * | 7/2002 | Chen et al. | ............... | 707/104.1 |
| 6,615,365 B1 * | 9/2003 | Jenevein et al. | ................ | 714/6 |
| 6,636,958 B2 * | 10/2003 | Abboud et al. | .............. | 711/173 |
| 6,661,910 B2 * | 12/2003 | Jones et al. | .................. | 382/135 |
| 6,732,162 B1 * | 5/2004 | Wood et al. | .................. | 709/219 |
| 6,857,011 B2 * | 2/2005 | Reinke | ........................ | 709/220 |
| 6,898,705 B2 * | 5/2005 | Abboud et al. | .............. | 713/100 |
| 6,920,555 B1 * | 7/2005 | Peters et al. | ................ | 713/100 |
| 6,947,954 B2 * | 9/2005 | Cohen et al. | ............. | 707/104.1 |
| 6,999,913 B2 * | 2/2006 | Hensley | ........................ | 703/25 |
| 7,062,672 B2 * | 6/2006 | Owhadi et al. | .................. | 714/6 |
| 7,082,527 B2 * | 7/2006 | Zimmer et al. | .................. | 713/2 |
| 7,100,011 B2 * | 8/2006 | Winters et al. | .............. | 711/165 |
| 2003/0018759 A1 * | 1/2003 | Baumann | ..................... | 709/221 |
| 2003/0058484 A1 * | 3/2003 | Kuo | ............................ | 358/474 |
| 2003/0202690 A1 * | 10/2003 | Jones et al. | ................. | 382/139 |
| 2004/0088367 A1 * | 5/2004 | Reinke | ........................ | 709/215 |
| 2004/0243648 A1 * | 12/2004 | Hidaka et al. | ............... | 707/200 |
| 2005/0125513 A1 * | 6/2005 | Sin-Ling Lam et al. | ..... | 709/220 |

(Continued)

OTHER PUBLICATIONS

Hibler, Mike; Stoller, Leigh; Lepreau, Jay; Ricci, Robert; Barb, Chad; "Fast, Scalable Disk Imaging with Frisbee", USENIX 2003, retrieved from scholar.google.com search Apr. 12, 2007.*

(Continued)

*Primary Examiner*—Anna Deng
(74) *Attorney, Agent, or Firm*—Austin Rapp & Hardman

(57) ABSTRACT

A system for imaging a computer system is disclosed. An administrative computer system includes an image for use with a target computer system and an imaging server for managing imaging processes on other computers. A target computer system includes or is in communication with a computer-readable medium that includes instructions to implement a method for writing the image to a storage device. The target computer system has a hard drive having a file system. The image is received from the administrative computer system. The image is stored on the hard drive of the target computer system without using the file system. The image is written to the hard drive of the target computer system using an imaging tool. The imaging tool uses a temporary file system to access the image. The temporary file system is transparent to the imaging tool.

14 Claims, 9 Drawing Sheets

U.S. PATENT DOCUMENTS

2006/0083442 A1* 4/2006 Loukipoudis et al. ....... 382/305

OTHER PUBLICATIONS

Koan, R. Mark; Caye, Keyyl; Brawn, Steven K; "It Takes a Village to Build an Image", p. 200-207, 2003 ACM, retrieved Apr. 12, 2007.*

Milo, Dejan S; Douglis, Fred; Paindaveine, Yves; Wheeler, Richard; Zhou, Songnian; "Process Migration", ACM 2000, p. 241-299, retrieved Apr. 12, 2007.*

Joshi et al. "A new performance evaluation approach for system level design space exploration", Oct. 2002, ACM, pp. 180-185.*

Hess et al. "An application of a context-aware file system", Dec. 2003, Springer-Verlag, vol. 7, Issue 6, pp. 339-352.*

Richichi et al. "Supporting Ubiquitous Computing Through Directory Enabled Technologies", Oct. 2001, ACM, pp. 157-163.*

Koan et al. "It takes a village to build an image", ACM, Sep. 2003, pp. 200-207.*

"Hands-off deployment and management of PC labs and classrooms", LabExpert Website, http://www.innovativeeducation.com/altiris/le_InDepth/le_indepth.htm.

"Altiris eXpress 4.0 takes over system installations", InfoWorld Website, Oct. 18, 1999, Mike Avery, http://archive.infoworld.com/articles/pi/xml/99/10/18/991018piexpress.xml.

"Altiris Inc. Expands Functionality of LabExpert and RapiDelivery", Altiris Website, Press Release Feb. 24, 1999, http://www.altiris.com/company/pressreleases/view.asp?pr=19.

* cited by examiner

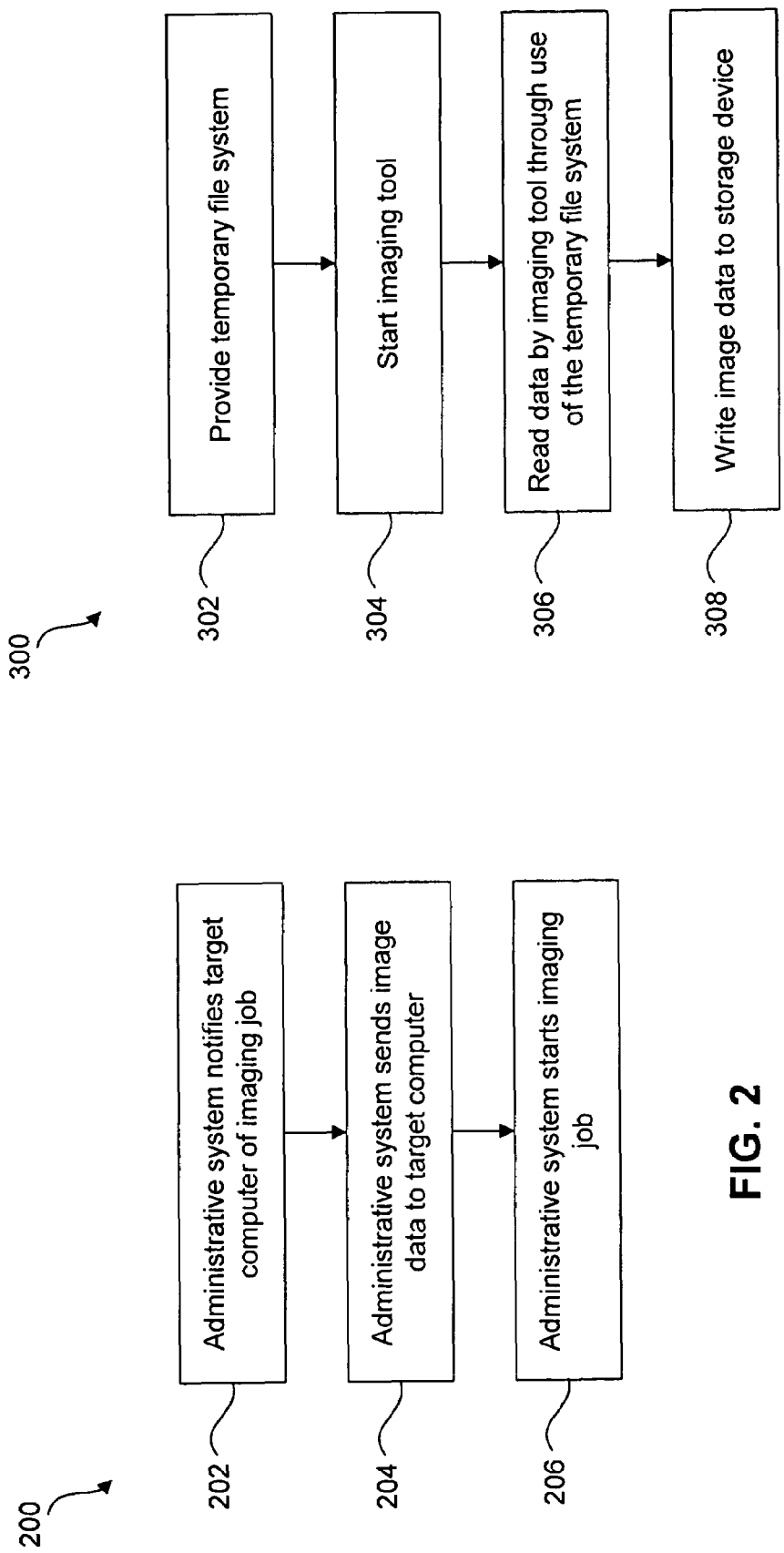

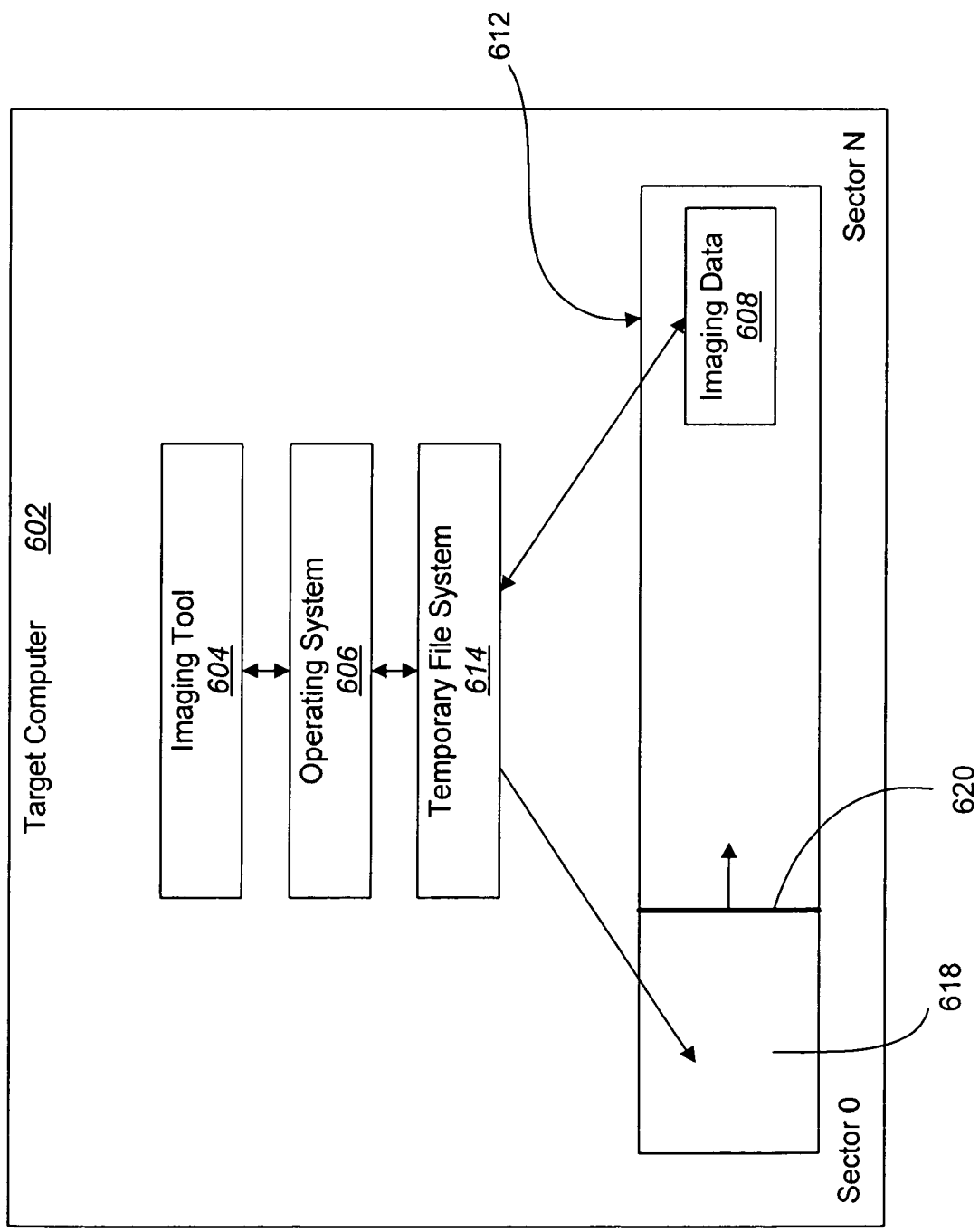

SYSTEMS AND METHODS FOR WRITING AN IMAGE TO A COMPUTER SYSTEM

TECHNICAL FIELD

The present invention relates generally to computer system administration. More specifically, the present invention relates to systems and methods for writing an image to a computer system.

BACKGROUND

Computer and communication technologies continue to advance at a rapid pace. Indeed, computer and communication technologies are involved in many aspects of a person's day. For example, many devices being used today have a small computer inside of the device. These small computers come in varying sizes and degrees of sophistication. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. Most companies have one or more computer networks and also make extensive use of the Internet. The productivity of employees often requires human and computer interaction. Improvements in computers and software have been a force for bringing about great increases in business and industrial productivity.

Maintaining and supporting computer systems is important to anyone who relies on computers. Whether a computer or computing device is in a home or at a business, at least some maintenance and/or support is often needed. For example, sometimes there are problems with computer hardware. In addition, computer hardware is often upgraded and replaced with new components. Similarly computer software is also frequently upgraded or replaced. New computer hardware and software is continually being integrated into systems across the world.

Installing new software or updating current software is typically an ongoing task. Sometimes installing new software may take a substantial amount of time to perform. In addition, if mistakes are made during installation, problems may occur thereafter which could decrease the production of an employee. As corporate performance and end-user productivity have become increasingly dependent on computers, computer support personnel are often used to maintain computers for a company. The support personnel are also under pressure to perform tasks as efficiently as possible which may include minimizing effects to existing computer systems or minimizing any disturbance of computer users.

There are many computer programs now available to help computer support personnel to provide computer support and maintenance. Some of these programs can effectively install new software and/or operating systems by copying certain data to the storage device of the computer system. Copying data to the storage device of the computer system to place updated or different software to the system may be referred to as imaging or disk imaging. Imaging enables computer support personnel to upgrade, update or change a system faster than if he or she had to do it manually.

As shown from the above discussion, there is a need for systems and methods that will improve the ability to manage and support computer systems. Improved systems and methods may enable a person performing computer support to work more efficiently and accomplish more less time. Benefits may be realized by providing increased functionality to assist in computer maintenance and support.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

FIG. 2 is a flow diagram of a general method for imaging a target computer system across a computer network;

FIG. 3 is a flow diagram of a method for imaging on the target computer;

FIG. 6 is a block diagram of the target computer illustrating one method of operation of the imaging tool;

DETAILED DESCRIPTION

Figure 1:
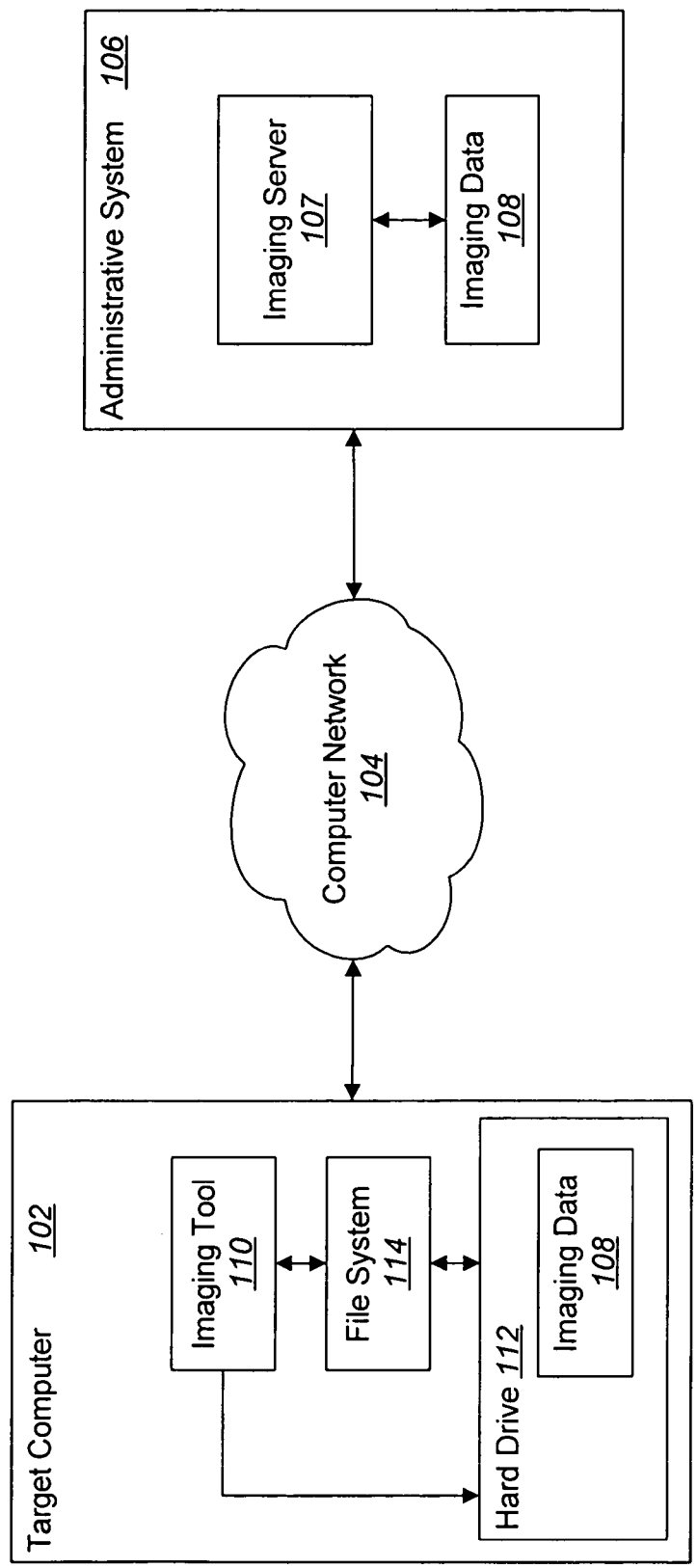
FIG. 1 is a network block diagram of an image being sent to and restored on a target computer system.

A method for writing an image to a storage device of a computer system is disclosed. The computer system has a current operating system and includes a hard drive that has a file system with one or more partitions. An image is received and stored on the computer system. An imaging tool is used to write the image to the one or more partitions of the computer system. The imaging tool uses a temporary file system to access the image. The temporary file system is transparent to the imaging tool and is not the file system of the hard drive.

The image may be stored on the one or more partitions of the computer system without using the file system. For example, the image may be stored on an unformatted partition of the hard drive. This installation may be the final sectors of the partition. The image may be sent from an administrative system to the computer system. The image may be multicast by the administrative system.

In one embodiment, the image is written to the hard drive of the computer system such that the imaging tool is accessing the image from the same partition as it is writing the image to.

There may be an imaging operating system running that is different than the current operating system. The imaging tool may operate on the imaging operating system. One example of an imaging operating system is DOS.

The temporary file system may be implemented at the BIOS level through use of an interrupt. The temporary file system may be implemented at the BIOS level by redirecting access of one or more storage devices.

A computer-readable medium for storing program data is also disclosed. The program data comprises executable instructions for implementing a method for writing an image to a storage device of a computer system. The method runs an imaging operating system on the computer system. The computer system has a current operating system that is not running. The computer further includes a hard drive that has a file system along with one or more partitions. An image is received and stored on one of the partitions of the computer system without using the file system. An imaging tool is used to write the image to the hard drive of the computer system. The imaging tool uses a temporary file system to access the image. The temporary file system is transparent to the imaging tool and is not the file system of the hard drive.

A system for imaging a computer system is disclosed. An administrative computer system includes an image for use with a target computer system and an imaging server for managing imaging processes on other computers. A target computer system includes or is in communication with a computer-readable medium that includes instructions to implement a method for writing the image to a storage device. The target computer system has a hard drive having a file system and one or more partitions. The image is received from the administrative computer system. The image is stored on the one or more partitions of the hard drive of the target computer system without using the file system. The image is written to the hard drive of the target computer system using an imaging tool. The imaging tool uses a temporary file system to access the image. The temporary file system is transparent to the imaging tool.

It will be readily understood that the components of the embodiments as generally described and illustrated in the Figures herein could be arranged and designed in a wide variety of different configurations. Thus, the following more detailed description of the embodiments of the systems and methods of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Several aspects of the embodiments described herein will be illustrated as software modules or components stored in a computing device. As used herein, a software module or component may include any type of computer instruction or computer executable code located within a memory device and/or transmitted as electronic signals over a system bus or network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction, or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

Note that the exemplary embodiment is provided as an exemplar throughout this discussion, however, alternate embodiments may incorporate various aspects without departing from the scope of the present invention.

The order of the steps or actions of the methods described in connection with the embodiments disclosed herein may be changed by those skilled in the art without departing from the scope of the present invention. Thus, any order in the Figures or detailed description is for illustrative purposes only and is not meant to imply a required order unless explicitly stated herein.

Although the embodiments herein are described with reference to multicast jobs, they may be applied to broadcast jobs, point to multipoint, and multipoint to multipoint jobs as well.

A system for imaging a computer system is disclosed. An administrative computer system includes an image for use with a target computer system and an imaging server for managing imaging processes on other computers. A target computer system includes or is in communication with a computer-readable medium that includes instructions to implement a method for writing the image to a storage device. The target computer system has a hard drive with one or more partitions intended to receive the image in its runnable format. The image is received from the administrative computer system. The image is temporarily stored at the end of the one or more partitions of the hard drive of the target computer system, without using the file system. In one embodiment this temporary copy of the image is stored in the same file format as it was created when originally captured by the third-party imaging tool. The system then provides a file system by which any imaging tool can access the temporary copy of the image located at the end of the partition(s). The image is then read from the end of the partition(s) via this file system and re-written as a bootable operating system to the "front" of the partition(s) of the target computer system by the third-party imaging tool. The fact that the provided file system is hosted on the same drive is transparent to the imaging tool. In fact, if the imaging tool is not going to "verify" the installed image by re-accessing the data from the source (at the end of the disk), it is possible that the source and destination images overlap each other (in other words, the partition can be less than twice the size of the image and still store the temporary copy of it long enough to successfully deploy the runnable copy of it).

FIG. 1 is a network block diagram of an image being sent to and restored on a target computer system. The target computer system 102 is in electronic communication with a computer network 104. In addition, an administrative system 106 is also in electronic communication with the computer network 104.

In many contexts, administrators of a computer network 104 are responsible for installing software on computers that are on the computer network 104. Administrators may help achieve this by using one or more images that may be sent to and copied onto one or more target computer systems 102.

Usually image data 108 is initially on the administrative system 106. The image data 108 is sent to the target computer 102 where an imaging tool 110 writes or stores the image to one or more partitions on the hard drive 112. Those skilled in the art will appreciate how various images may be restored to computer systems to effectively place a new set of software and/or operating system on the computer 102. The image data 108 may be stored on one or more partitions of the hard drive 112 while the target computer 102 is preparing to restore the image.

Imaging or disk imaging generally refers to a process that can effectively install new, updated or different software and/ or operating systems by copying certain data to the storage device of the computer system. For a computer user to install an operating system, the user would typically use one or more CD-ROMs or DVD-ROMs from the manufacturer or software company and walk through the installation process, which is typically interactive. Installing new software is similar in that the user typically uses one or more CD-ROMs or DVD-ROMs to install the software through an interactive installation process. Some software may also be downloaded from the Internet and saved to a file, and then the software may be installed from the saved filed. After something has been installed onto a computer system, a snapshot may be taken of the storage device(s) of the computer system at a certain point in time. This snapshot may be referred to as an image. If the user ever wanted to go back to that state, he or she may simply re-image the drive with the snapshot or image. In addition, other computers with a compatible configuration may also be imaged using that same image to install the same set of software to the computer. Thus imaging enables computer support personnel to upgrade, update or change a system faster than if he or she had to do it manually. The term imaging as used herein is broadly defined as writing a set of data to a storage device to effect a change to the computer system without going through a typical manual installation process. Sometimes the terms restoring, copying or storing are also used to describe an imaging job.

Software 107 may be running on the administrative system 106 to communicate the image data 108 to the target computer system 102. The software 107 may be referred to as an imaging server 107. The imaging server 107 typically communicates with and directs the imaging tool 110 to carry out various tasks. A system administrator may configure and use the imaging server 107 to update various computer systems on the computer network 104.

The image data 108 is typically embodied in one or more files, which may be manipulated through the use of a file system 114. As shown in FIG. 1, systems and methods herein may enable the imaging tool 110 to manipulate data on the hard drive 112 without necessarily using the file system 114.

FIG. 2 is a flow diagram of a general method 200 for imaging a target computer system 102 across a computer network 104. The administrative system 106 notifies 202 the target computer 102 of the imaging job. This may be achieved in various ways. For example, the target computer 102 may have an application running that is listening for messages from the administrative system 106 such that the administrative system 106 may send a notification or message to the target computer 102. The notification may be any type of electronic communication. For example, the notification may be an email message, an SNMP trap, a proprietary alert, a broadcast, a packet, etc. Those skilled in the art will appreciate the various ways in which a message may be communicated across a computer network.

The image data 108 is sent 204 by the administrative system 106 to the target computer 102. The administrative system 106 starts 206 the imaging job or causes it to be started.

In another embodiment the imaging job may be carried out on the local target computer 102 without instructions being sent across the computer network 104. For example, a new image may be stored on a CD-ROM and manually inserted into the target computer's 102 CD-ROM drive. The user or administrator may then manually configure or cause the target computer to start an imaging job.

FIG. 3 is a flow diagram of a method 300 for imaging on the target computer 102. A temporary file system is provided 302. An imaging tool is started 304. Then the imaging data 108 is read by the imaging tool 110 through use of the temporary file system 414 (see FIG. 4) and written 308 to a storage device.

Figure 4:
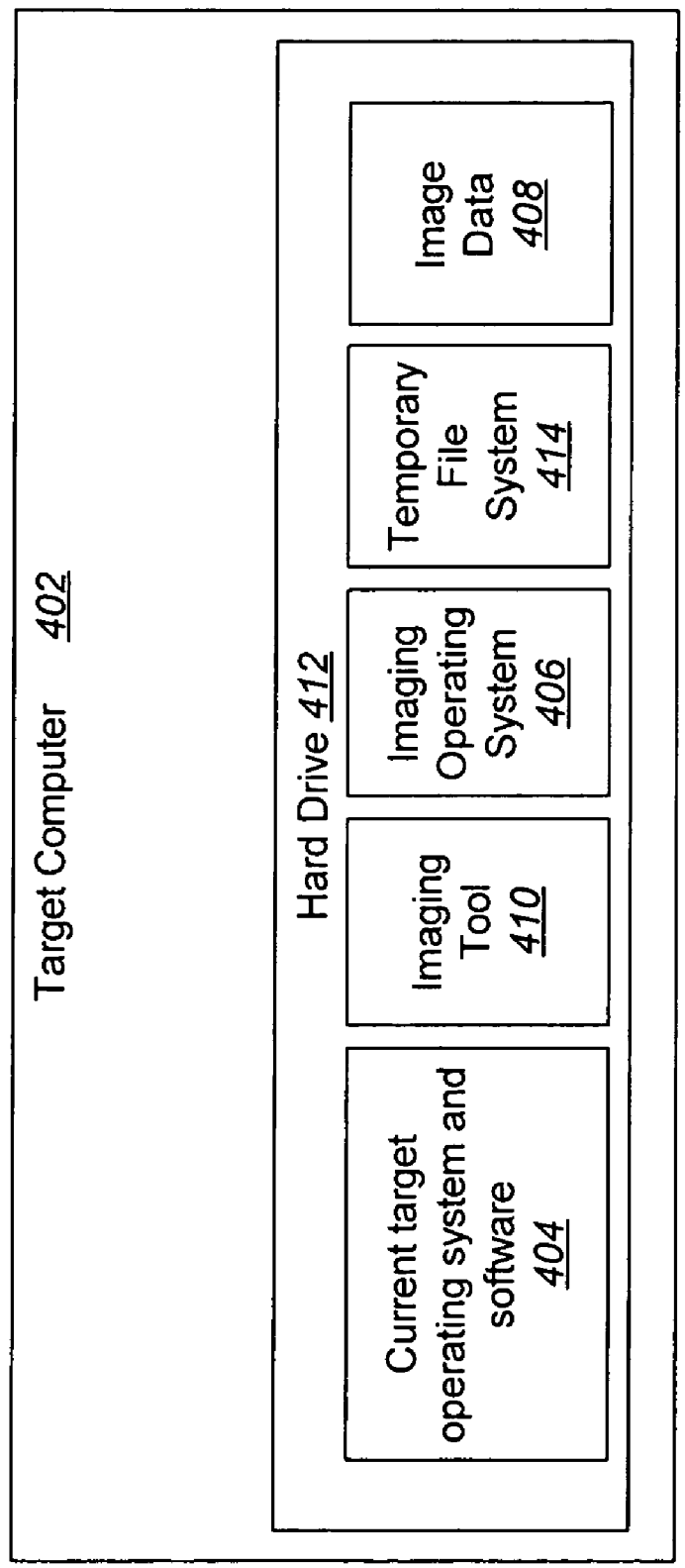
FIG. 4 is a block diagram of an embodiment of a target computer illustrating the various components that may be stored on the hard drive.

FIG. 4 is a block diagram of an embodiment of a target computer 402 illustrating the various components that may be stored on the hard drive 412. The current operating system and software 404 may be stored on the hard drive 412. The current operating system and software 404 represents the operating system and software typically used by the user of the target computer 402.

An imaging tool 410 may also be stored on the hard drive 412. The imaging tool 410 is software that is used to image or re-image the hard drive 412. An imaging operating system 406 may also be stored on the hard drive 412. The imaging operating system 406 is typically a different and smaller operating system than the current target computer operating system. For example, the imaging operating system 406 may be DOS. However, many other operating systems may be used as the imaging operating system 406 including, but not limited to, PXE, Linux, Microsoft Windows, etc.

A temporary file system 414 is also stored on the hard drive 412. The temporary file system 414 is used to provide a file system for the imaging tool 410 and/or the imaging operating system 406. The temporary file system 414 is an installable file system, which means that it can be put in place such that the imaging tool 410 and/or imaging operating system 406 can use it to access the image data 408. The temporary file system 414 is not the same file system as the file system that is included as part of the current operating system 404. Typically the file system of the current operating system 404 will be overwritten during the imaging process, which is why the temporary file system 414 is needed.

The temporary file system 414 makes the image data 408 accessible by the imaging operating system 406 and/or the imaging tool 410. This may be done through use of a virtualized drive. For example, the temporary file system 414 may act as a redirector and redirect access to a new drive (e.g., direct access to a G: drive) and to the image data 408, which is also stored on the hard drive 412.

Figure 5:
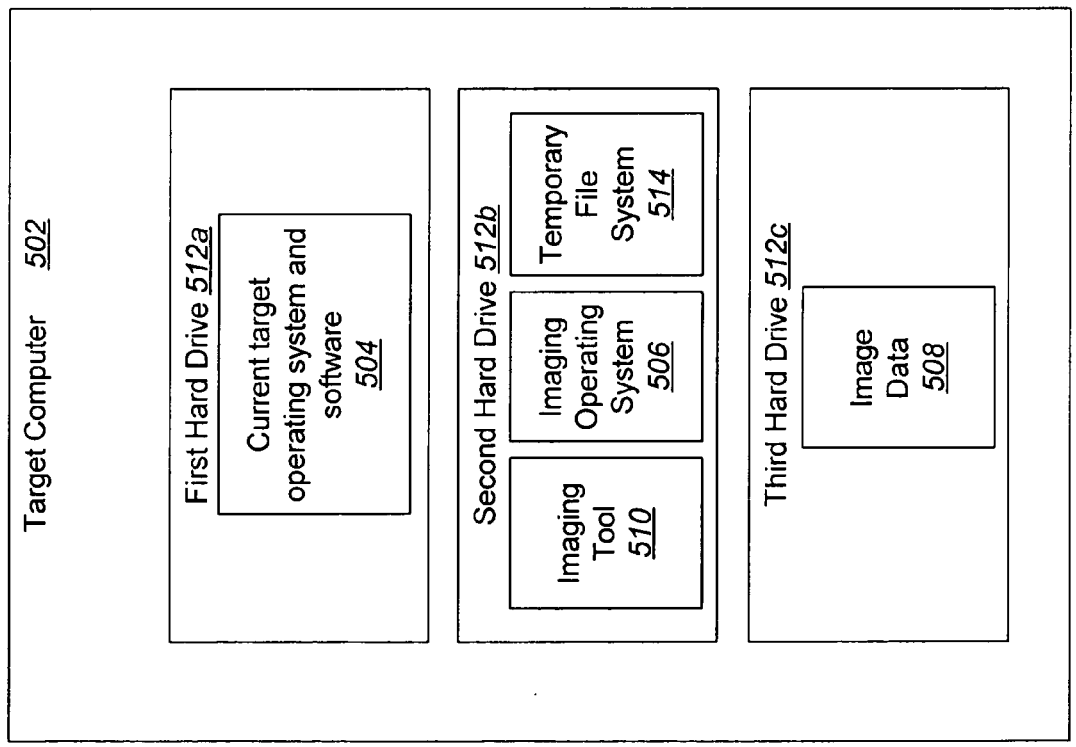
FIG. 5 is another embodiment of a target computer system that includes multiple storage devices.

FIG. 5 is another embodiment of a target computer system 502 that includes multiple storage devices 512a-c. Storage devices 512 include, but are not limited to, hard drives, floppy drives, CD-ROM drives, optical drives, memory, a remote file on another computer, etc. As illustrated the software and data shown in FIG. 4 as being stored on one hard drive 412 may be spread out and stored across several storage devices 512a-c. The current operating system and software 504 may be stored on the first storage device 512a. The imaging tool 510, imaging operating system 506 and temporary file system 514 may be stored on the second storage device 512b. The image data 508 may be stored on the third storage device 512c. Those skilled in the art will appreciate that the location of the various components shown in the diagram may be stored at different locations without altering the invention.

FIG. 6 is a block diagram of the target computer 602 illustrating one method of operation of the imaging tool 604. The imaging tool 604 makes calls to the operating system 606. The operating system 606 accesses the storage device 612 through functionality provided by the temporary file system 614. The temporary file system 614 reads in the image data 608 from the storage device 612 and provides it for the imaging tool 604. Writing to the storage device 612 may also be accomplished through use of the temporary file system 614.

The temporary file system 614 is transparent to the imaging tool 604 because the imaging tool 604 does not need to have any knowledge about the temporary file system 614. By making the temporary file system 614 transparent to the imaging tool 604, many different brands of imaging tools 604 may be used with the temporary file system 614. For the embodiment shown in FIG. 6, by placing the temporary file system 614 at the level of the operating system 606 or lower, the temporary file system 614 is transparent to the imaging tool 604. Of course, those skilled in the art will appreciate that other ways in which the temporary file system 614 will not be tightly coupled to the imaging tool 604. Alternatively, those skilled in the art may design a system where the imaging tool 604 does have some knowledge about the temporary file system 614 and, as a result, there may be some level of coupling between the imaging tool 604 and the temporary file system 614.

An imaged area 618 on the storage device has been written to by the imaging tool 604. As imaging continues, the size 620 of the imaged area 618 continues to grow. As shown, the image data 608 is stored on a part of the storage device 612 so that it will not be overwritten before it is used in imaging the storage device 612. When the command to restore the image is made, the image is typically restored in the first part of the drive while the data is being read from the end part of the drive. This is particularly true when an image is then restored and the partition is then expanded to fill the entire drive.

Typically the image data 608 is stored on the final sectors of a partition 612 as shown in FIG. 6. For illustrative purposes the partition 612 in FIG. 6 is referenced with the same reference numeral as the storage device 612. The image data could also be stored at the end of several partitions. Additionally, the partition(s) where the image data is stored does not need to be formatted. With the present system, it is useful that the image may be stored on the drive itself without being stored on a formatted portion of the disk and/or without using the current file system. Because the current target computer operating system 404 will probably not be in use during the image process, the image data 608 needs to be stored on the drive itself without using the current formatting and file system.

The systems and methods herein provide the ability to multicast an image and restore it using many different kinds of imaging technologies which provide an advantage over only being able to multicast one image type and use a single imaging tool.

Figure 7:
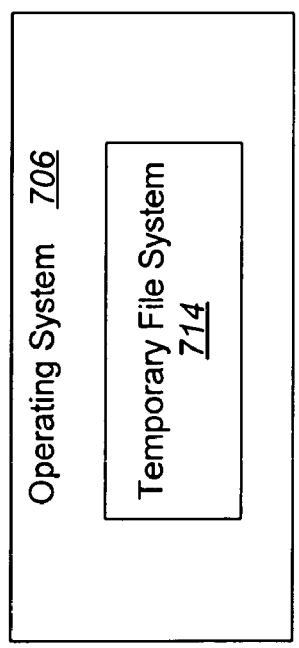
FIG. 7 is a block diagram illustrating an embodiment of a temporary file system.

The temporary file system 614 may be embodied in various forms. For example, as shown in FIG. 7, the temporary file system 714 may be part of the operating system 706. The temporary file system may also be a separate component and not part of the operating system. In addition, the temporary file system may include some components that are part of the operating system and some components that are not part of the operating system.

Figure 8:
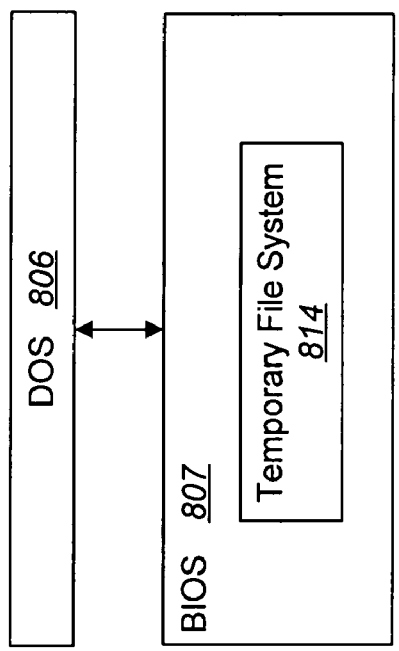
FIG. 8 is a block diagram illustrating another embodiment of a temporary file system.

FIG. 8 is a block diagram illustrating a temporary file system 814 being used with DOS 806. DOS 806 is an embodiment of the imaging operating system 406. The BIOS (Basic Input Output System) provides an interface between the operating system 806 and the hardware. In the embodiment shown in FIG. 8, the temporary file system 814 is implemented by replacing the BIOS interrupt number 13 (for disk/diskette access) with a modified routine that reads in the data from the image data 608. When a call comes through DOS 806 for reading in data from the hard drive, the "INT 13" call is intercepted and handled by the modified or new routine. Other interrupts in addition to interrupt number 13 may also be used to accomplish supporting a file system. Although a DOS/BIOS-based file system solution is described in this example, any operating system that supports an "installable file system" can support this model.

Figure 9:
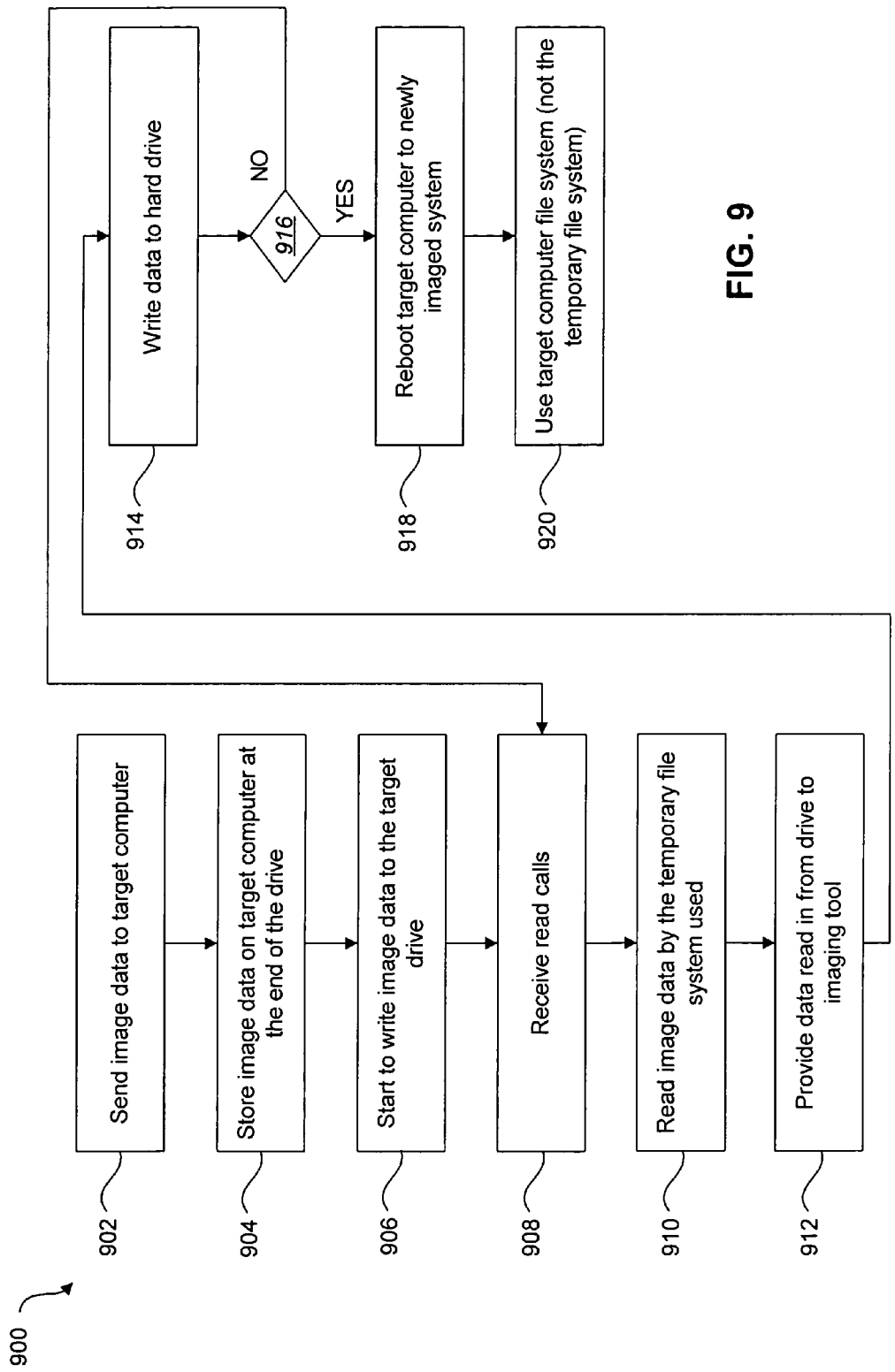
FIG. 9 is a flow diagram illustrating a method for using an imaging tool in combination with a temporary file system to image a computer system.

FIG. 9 is a flow diagram illustrating a method for using an imaging tool in combination with a temporary file system to image a computer system. For the method illustrated it is assumed that the target computer system is already running the imaging operating system 406. However, it will be appreciated by those skilled in the art that some of the steps illustrated in FIG. 9 may be accomplished while running the current target computer operating system and software 404.

The image data 108 is sent 902 to the target computer 102. The image data 108 may be sent 902 in a variety of ways. For example, it may be sent via multicast, unicast, broadcast, point to multipoint, and multipoint to multipoint, etc. It is also possible that the image data 108 may simply be provided to the target computer system 102 in some way. For example, the image data 108 may be stored on a CD-ROM and manually delivered to the target computer. In addition, the image data 108 may be stored on a storage device in electronic communication with the computer (e.g., a network drive), and the computer may read the data 108 from the storage device.

The image data 108 is stored 904 on the target computer 102. If there is only one hard drive to image, and/or if the image data 108 is to be stored in a partition on the same drive that will be imaged, the image data 108 is stored at the end of the partition so that it will not be overwritten in the initial phases of imaging.

The embodiment then starts to write 906 the image data 108 to the target drive 112. Read calls are received 908 at some point by the temporary file system 414. A portion of the image data 108 is read 910 by the temporary file system 414 and provided 912 to the imaging tool 410. The portion of the image data may be provided directly or indirectly to the imaging tool. The portion of the image data is then used to write 914 data to the hard drive. A determination 916 is made as to whether further imaging is needed to complete the imaging job. If further imaging is needed, the processing may continue with the receiving 908 of the next read function call. If no further imaging is needed, the target computer may be rebooted 918 into the newly imaged system. The user then has the ability to use 920 the target computer system which includes a file system that is a different file system than the temporary file system.

Figure 10:
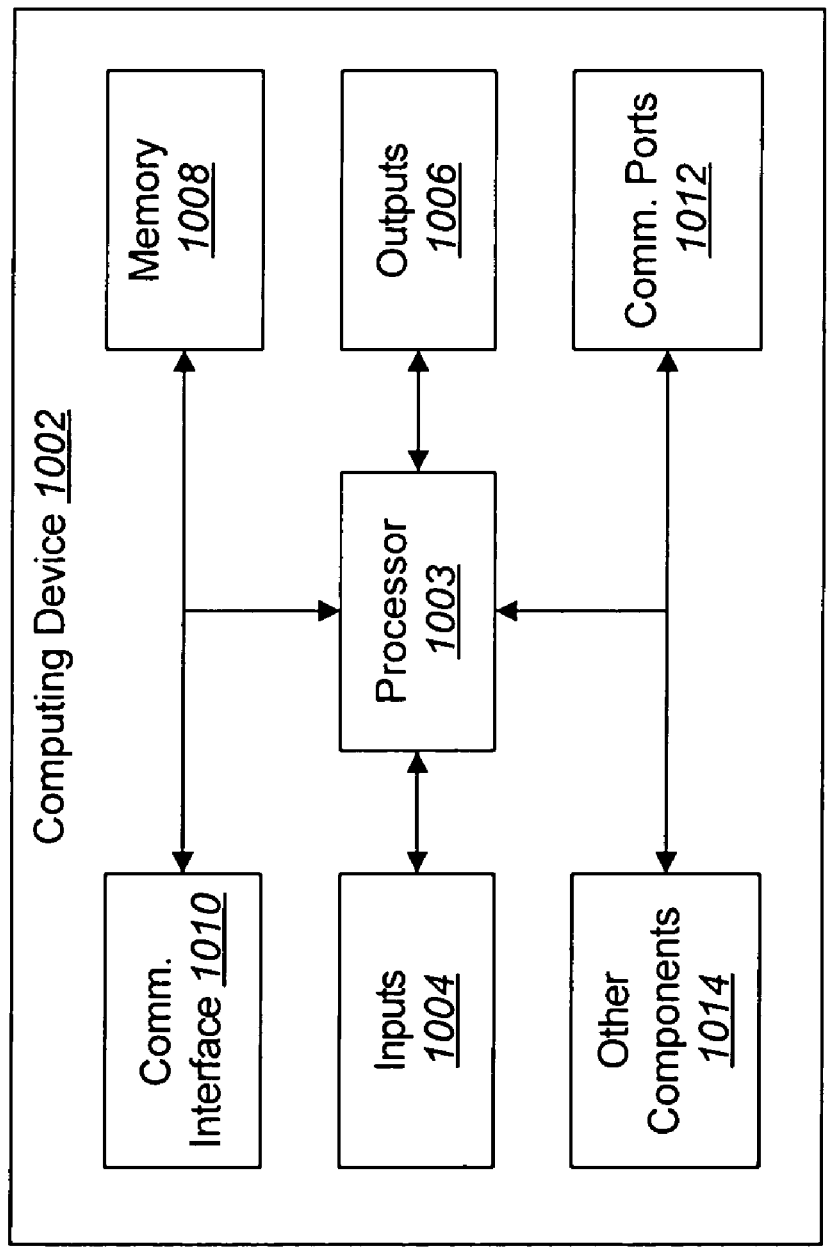
FIG. 10 is a block diagram illustrating the major hardware components typically utilized in a computer or computing device.

FIG. 10 is a block diagram illustrating the major hardware components typically utilized in a target computer or target computing device used with embodiments herein. Computers and/or computing devices 1002 are known in the art and are commercially available. The major hardware components typically utilized in a computing device 1002 are illustrated in FIG. 10. A computing device 1002 typically includes a processor 1003 in electronic communication with input components or devices 1004 and/or output components or devices 1006. The processor 1003 is operably connected to input 1004 and/or output devices 1006 capable of electronic communication with the processor 1003, or, in other words, to devices capable of input and/or output in the form of an electrical signal. Embodiments of devices 1002 may include the inputs 1004, outputs 1006 and the processor 1003 within the same physical structure or in separate housings or structures.

The electronic device 1002 may also include memory 1008. The memory 1008 may be a separate component from the processor 1003, or it may be on-board memory 1008 included in the same part as the processor 1003. For example, microcontrollers often include a certain amount of on-board memory. The memory 1008 may be embodied in RAM, a hard drive, a CD-ROM drive, a DVD-ROM drive, network storage, etc. The memory 1008 is broadly defined, as any electronic component capable of storing electronic information.

The processor 1003 is also in electronic communication with a communication interface 1010. The communication interface 1010 may be used for communications with other devices 1002. Thus, the communication interfaces 1010 of the various devices 1002 may be designed to communicate with each other to send signals or messages between the computing devices 1002. A network card or wireless card may be used to implement a communication interface 1010.

The computing device 1002 may also include other communication ports 1012. In addition, other components 1014 may also be included in the electronic device 1002.

Of course, those skilled in the art will appreciate the many kinds of different devices that may be used with embodiments herein. The computing device 1002 may be a one-chip computer, such as a microcontroller, a one-board type of computer, such as a controller, a typical desktop computer, such as an IBM-PC compatible, a Personal Digital Assistant (PDA), a Unix-based workstation, a router, etc. Accordingly, the block diagram of FIG. 10 is only meant to illustrate typical components of a computer or computing device 1002 and is not meant to limit the scope of embodiments disclosed herein.

FIG. 10 illustrates a computer system 1002 that includes or is in electronic communication with a machine-readable medium (memory) on which is stored a set of instructions according to embodiments herein. Although described in the context of a computer system 1002, the embodiments herein may be implemented in any suitable computer system comprising any suitable one or more integrated circuits.

Accordingly, computer system 1000 includes or is in communication with a computer-readable medium on which is stored a set of instructions (i.e., software) embodying any one, or all, of the methodologies described above. For example, software can reside, completely or at least partially, within main memory and/or within processors 1003. For the purposes of this specification, the term "computer-readable medium" shall be taken to include any mechanism that provides (i.e., stores and/or transmits) information in a form readable by a machine (e.g., a computer). For example, a computer-readable medium includes read only memory (ROM); random access memory (RAM); magnetic disk storage media; optical storage media; flash memory devices.

Figure 11:
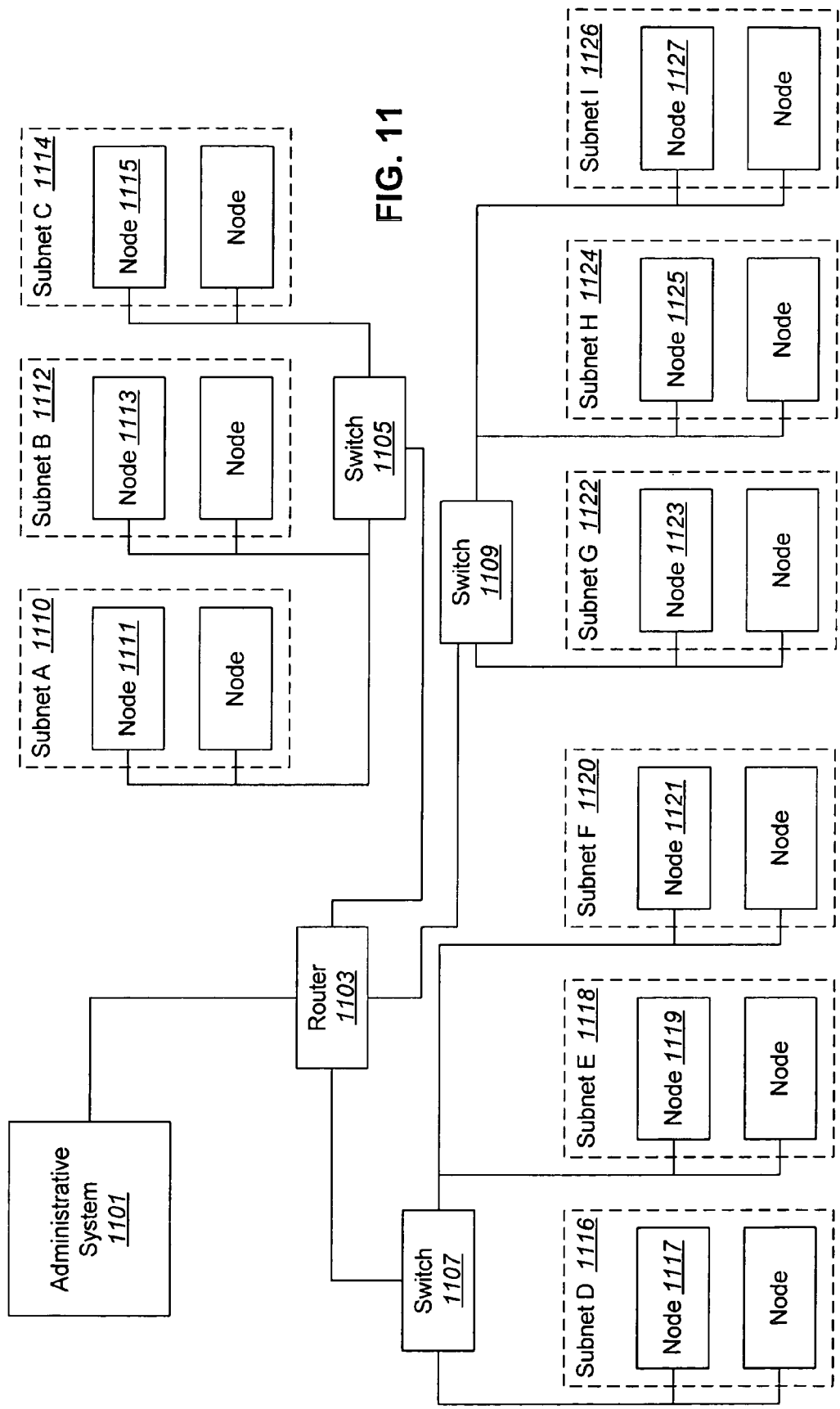
FIG. 11 is an exemplary block diagram illustrating a computer network on which the present systems and methods may be implemented.

FIG. 11 is an exemplary block diagram illustrating a computer network on which the present systems and methods may be implemented. In FIG. 11, an administrative system 1101 connects to a router 1103. The administrative system 1101 may be any computer or computing device that has been configured to, or is being used for, receiving notifications from one or more monitors.

The router 1103 may be connected to three switches: a first switch 1105, a second switch 1107 and a third switch 1109. Each switch 1105, 1107, 1109 connects to three subnets. The first switch 1105 connects to three subnets 1110, 1112, and 1114. The second switch 1107 connects to three subnets 1116, 1118, and 1120. The third switch 1109 connects to three subnets 1122, 1124, and 1126. The network nodes or elements 1111, 1113, 1115, 1117, 1119, 1121, 1123, 1125 and 1127 represent computer systems or devices on the computer network. One or more of the nodes may use embodiments of the imaging systems and methods herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for writing an image to a storage device of a computer system, the method comprising:
   receiving an image on the computer system, wherein the computer system has a current operating system and includes a hard drive having a file system;
   storing the image on the computer system;
   using an imaging tool to read the image from the computer system by making read calls to a temporary file system and write the image to the hard drive of the computer system through a use of the temporary file system, wherein the temporary file system is implemented at a BIOS level through a use of an interrupt, wherein the temporary file system is transparent to the imaging tool, wherein the temporary file system is not the file system of the hard drive, and wherein the imaging tool writes the image to the hard drive of the computer system such that the imaging tool accesses the image from a same partition of the hard drive as to which the imaging tool is writing the image.

2. The method of claim 1, wherein the image is stored on one or more partitions of the hard drive of the computer system without using the file system.

3. The method of claim 2, further comprising running an imaging operating system that is different than the current operating system, wherein the imaging tool operates on the imaging operating system.

4. The method of claim 3, wherein the imaging operating system comprises DOS.

5. The method of claim 1, further comprising sending the image from an administrative system to the computer system.

6. The method of claim 5, wherein the image is multicast by the administrative system.

7. The method of claim 2, wherein the image is stored on an unformatted partition of the hard drive and on the final sectors of the unformatted partition.

8. A computer-readable medium for storing program data, wherein the program data comprises executable instructions for writing an image to a storage device of a computer system, wherein the executable instructions are for:
   running an imaging operating system on the computer system, wherein the computer system has a current operating system that is not running, and wherein the computer system further includes a hard drive having a file system;
   receiving an image on the computer system;
   storing the image on the hard drive of the computer system without using the file system; and
   writing the image to the hard drive of the computer system using an imaging tool, wherein the image is read from the computer system by the imaging tool making read calls to a temporary file system and the image is written to the hard drive of the computer system through a use of the temporary file system, wherein the temporary file system is implemented at a BIOS level by redirecting access of one or more storage devices, wherein the temporary file system is transparent to the imaging tool, wherein the temporary file system is not the file system of the hard drive, and wherein the imaging tool writes the image to the hard drive of the computer system such that the imaging tool accesses the image from a same partition of the hard drive as to which the imaging tool is writing the image.

9. The computer-readable medium of claim 8, wherein the imaging operating system comprises DOS.

10. The computer-readable medium of claim 8, wherein executable instructions are further executable for communicating with an administrative system via a computer network.

11. The computer-readable medium of claim 10, wherein the image is stored on an unformatted portion of the hard drive which is on final sectors of one or more partitions of the hard drive.

12. A system for imaging a computer system, the system comprising:
   an administrative computer system in electronic communication with a computer network, wherein the administrative computer system comprises:
      an image for use with a target computer system; and
      an imaging server for managing imaging processes on other computers;
   the target computer system in electronic communication with the computer network, wherein the target computer system comprises:
      a computer-readable medium that is part of the target computer system or is in electronic communication with the target computer system, the computer-readable medium comprising instructions for the target computer system to write the image to a storage device, wherein the instructions are for:
         running an imaging operating system on the target computer system, wherein the target computer system has a current operating system that is not running, and wherein the target computer system further includes a hard drive having a file system;
         receiving the image from the administrative computer system;
         storing the image on the hard drive of the target computer system without using the file system; and
         writing the image to the hard drive of the target computer system using an imaging tool, wherein the image is read from the target computer system by the imaging tool making read calls to a temporary file system and the image is written to the hard drive of the target computer system through a use of the temporary file system, wherein the temporary file system is implemented at a BIOS level by redirecting access of one or more storage devices, wherein the temporary file system is transparent to the imaging tool, wherein the temporary file system is not the file system of the hard drive, and wherein the imaging tool writes the image to the hard drive of the target computer system such that the imaging tool accesses the image from a same partition of the hard drive as to which the imaging tool is writing the image.

13. The system of claim 12, wherein the imaging operating system comprises DOS.

14. The system of claim 12, wherein the image is stored on an unformatted partition of the hard drive which is on final sectors of the unformatted partition.

* * * * *

UNITED STATES PATENT AND TRADEMARK OFFICE
CERTIFICATE OF CORRECTION

| | | |
|---|---|---|
| PATENT NO. | : 7,757,228 B1 | Page 1 of 1 |
| APPLICATION NO. | : 10/787366 | |
| DATED | : July 13, 2010 | |
| INVENTOR(S) | : David A. Eatough et al. | |

It is certified that error appears in the above-identified patent and that said Letters Patent is hereby corrected as shown below:

In column 1, line 67 please delete "more less time" and replace it with --more in less time--.

In column 9, line 4 please delete "defined, as" and replace it with --defined as--.

In column 12, lines 6-7 please delete "wherein executable instructions" and replace it with --wherein the executable instructions--.

Signed and Sealed this

Twenty-first Day of December, 2010

David J. Kappos
*Director of the United States Patent and Trademark Office*